INVENTORS
ROBERT H. EISENGREIN
FRANCIS O. BLACKWELL III
& FOREST B. GOLDEN
BY Christel & Bean
ATTORNEYS

INVENTORS
ROBERT H. EISENGREIN
FRANCIS O. BLACKWELL III
& FOREST B. GOLDEN

BY Christel & Bean
ATTORNEYS

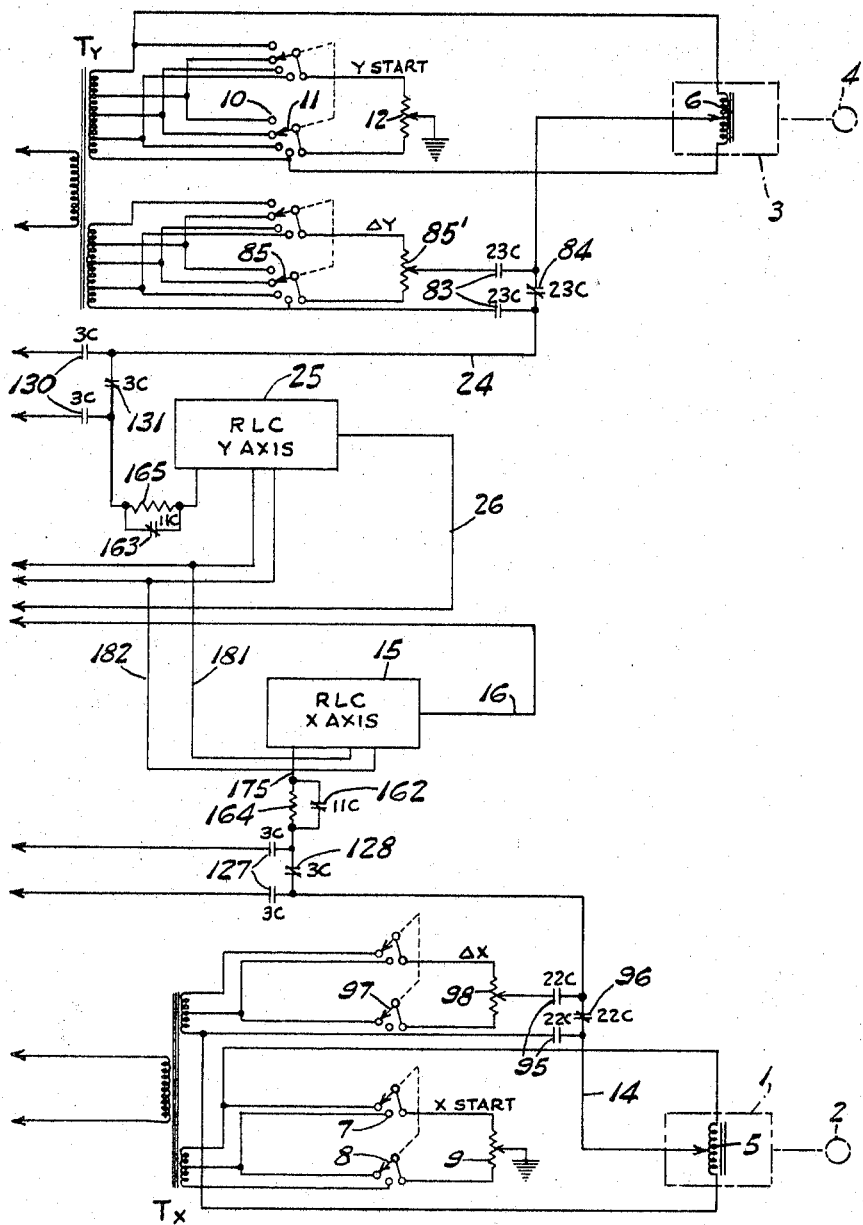

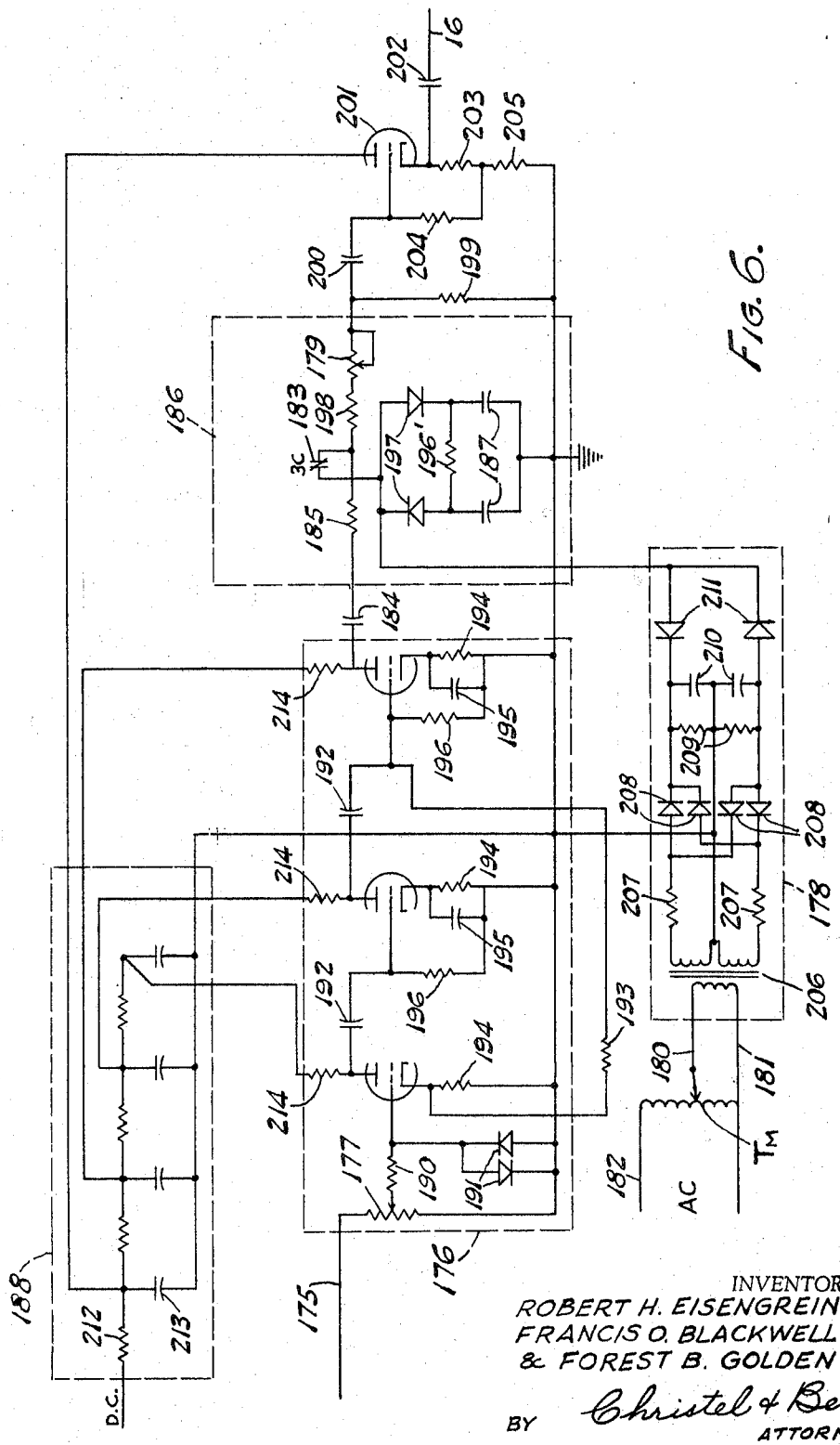

United States Patent Office 3,441,817
Patented Apr. 29, 1969

3,441,817
MACHINE CONTROL SYSTEM FOR GENERATING RECTILINEAR AND CURVILINEAR GEOMETRICAL FORMS
Robert H. Eisengrein, Skaneatales, and Francis O. Blackwell III and Forrest B. Golden, Seneca Falls, N.Y., assignors to SFM Corporation, a corporation of New Jersey
Filed Jan. 18, 1965, Ser. No. 426,276
Int. Cl. H02p 5/46; G05b 11/12
U.S. Cl. 318—18                                   15 Claims

ABSTRACT OF THE DISCLOSURE

A machine having first and second parts movable along first and second orthogonally related axes and drive motors for moving the parts. For each axis a variable inductance provides an electrical indication of the actual part position, and a transformer variably topped by a plurality of switches plus a variable resistance for each axis electrically indicates the desired part start position. A second set of switches and resistance on the same transformer and for each axis provides a voltage indicative of the distance to be traveled. A bidirectional shift register operates in response to an equality between signals indicative of actual position and distance to be traveled to sequentially activate a switching means which adds these two signals to each other. For each axis an amplifier and servomotor are included which are responsive to differences between the signals. A resolver is included having a first winding connected to a variable source of voltage and second quadrature windings connected through variable resistances to the amplifiers and servomotors for each axis. Circles can be generated by applying to the first winding a voltage indicative of the desired radius and then rotating the second windings; ellipses can be so generated by varying the magnitudes of the resistances connected to the quadrature windings. An acceleration control is connected in the amplifier-servomotor circuit and includes a variable gain amplifier, a limiting circuit, a conversion circuit for providing exponentially increasing waveforms and an attenuating network.

---

Figure 1:
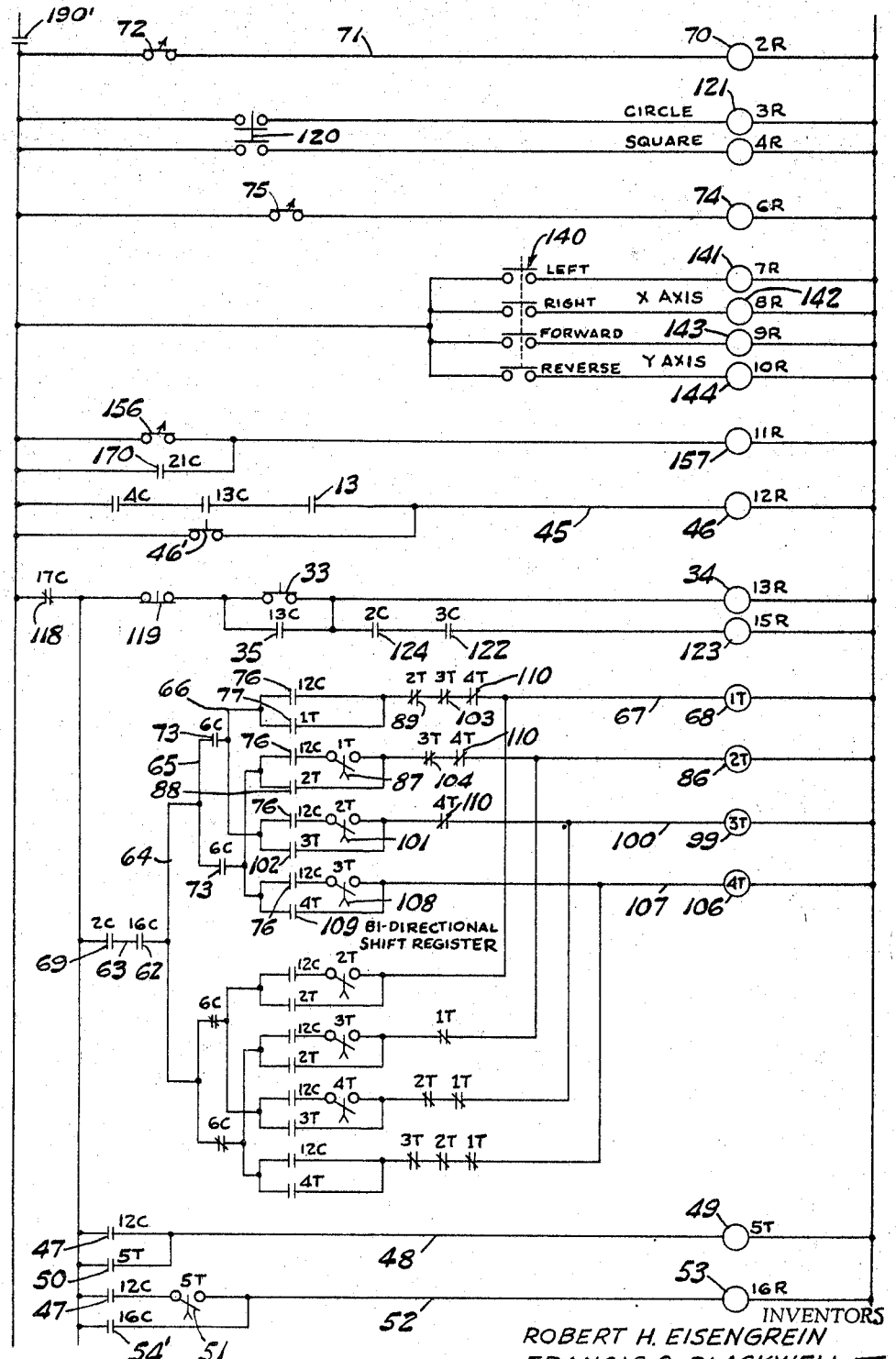

This invention relates generally to the control art, and more specifically to a new and useful machine control system for generating rectilinear and curvilinear geometrical forms.

The primary object of this invention is to provide a machine control system useable, for example with flame cutting apparatus, and operable to generate a rectangle, a circle or an ellipse.

In accomplishing the foregoing, a problem arises due to the acceleration and deceleration of the system as it proceeds along a rectangle or other rectilinear form. Where the machine drive is responsive to an electrical signal voltage, the drive speed is proportional to the voltage, whereby the machine will tend to start at high speed. As a result, there is an acceleration which is uncontrolled because it is always maximum. Flame cutting and other applications require movement at no more than a predetermined speed, in order to cut through the metal, whereby too rapid an acceleration will result in an uncut portion. Also, it is desirable to provide a constant speed, with apparatus such as flame cutting equipment, for uniformity in operation.

Therefore, another object of our invention is to provide a machine control system operable to generate rectilinear geometric forms, providing a constant drive speed throughout the intermediate part of travel, with controlled acceleration and deceleration at the beginning and end of each path traveled.

It is also an object of our invention to provide a machine control system for generating circles, ellipses and other curvilinear geometric forms, having means for varying the radius, in the case of a circle, and the axial components thereof in the case of an ellipse, while maintaining a substantially predetermined tangential velocity of the part being driven.

In one aspect thereof, a machine control system constructed in accordance with our invention is characterized by the provision, in combination with a machine having a first part movable along one axis and another part movable along another axis, and drive means for moving the parts along the axes, means producing a first signal indicating the actual position of the first part along the one axis, means producing a second signal indicating a desired start position of the first part along said one axis, means comparing said first and second signals and producing a third signal indicating the distance and direction from the actual position of the first part to the desired start position thereof along the one axis, means producing a fourth signal indicating the distance to be traveled by the first part along the one axis to and from the desired start position thereof, corresponding first, second, third and fourth signal producing means for the second part along the other axis, the drive means being responsive to the third signal producing means, and switching means operable to sequentially switch the fourth signal producing means into and out of the comparing means, whereby the drive means cause the first and second parts to traverse a rectangular path.

In another aspect thereof, a machine control system constructed in accordance with our invention is characterized by the provision, in combination with a machine part movable along angularly related axes, and drive means for moving the part along the axes, means defining a predetermined position of the part along one of the axes, means defining a predetermined position of the part along the other of the axes, resolver means having a first winding and quadrature second windings, means producing a signal across the first winding indicating the desired radius of the circle to be generated, means rotating one of the windings relative to the other, whereby the radius signal is resolved by the second winding into its axial components, and means connecting the second quadrature windings to the position defining means and the drive means, whereby the part is moved about the predetermined position, means for adjusting the radius signal producing means to vary the radius of travel of the part about said predetermined position, and means for varying the speed of rotation of the resolver.

In still another aspect thereof, a machine control system constructed in accordance with our invention is characterized by the provision, in combination with a machine part movable along angularly related axes, and drive means for moving the part along the axes, means defining a predetermined position of the part along the axes, resolver means having a first winding and angularly related second windings, means producing a signal across the first winding indicative of a radius, means rotating one of the windings relative to the other whereby the quadrature windings resolve the radius signal into its axial components, means connecting the quadrature windings to the drive means for driving the part in accordance with the axial components, and means for biasing the signal components to produce a varying radius of travel of the part.

The foregoing and other objects, advantages and characterizing features of a machine control system of our invention will become clearly apparent from the ensuing detailed description of an illustrative embodiment thereof, considered in conjunction with the accompanying drawings wherein like reference numerals denote like parts throughout, and wherein:

FIGS. 1–6 are generally schematic, wiring diagrams illustrating different portions of a machine control system of our invention.

For ease in following the ensuing detailed description, each relay and its associated contacts have a common designator, comprising a number followed by the letter R in the case of a relay, and C in the case of contacts. For time delay relays and switches, a legend consisting of a number followed by the letter T is used. This is in addition to reference numerals which apply to a relay, or to a single set of contacts.

Referring now to the accompanying drawings, there is shown in FIG. 5 a first machine supporting part 1, such as a carriage, movable along one axis, hereinafter called the X axis, by a drive motor 2. Another machine supporting part 3 is movable by a drive motor 4 along another axis, hereinafter called the Y axis, at right angles to the X axis of part 1. Motors 2 and 4 are energized from a suitable three phase source, not shown.

A variable inductance 5 is coupled to machine part 1, for indicating the position thereof along the X axis in electrical voltage, analog terms. In like manner, a variable inductance 6 is coupled to machine part 3, for indicating the position thereof along the Y axis. Of course, machine part 3 can be mounted on part 1, for movement therewith along the X axis and for movement relative thereto along the Y axis, in the manner of a machine tool carriage and slide.

The actual position of machine part 1 is compared to the desired start position thereof, as determined by a coarse position defining set of switches 7 having a set of movable contacts 8 for variably tapping across a transformer $T_x$. A variable resistance 9 is connected across the switches 7, 8, to provide a fine start position adjustment along the X axis.

In like manner, the actual position of machine part 3 is compared to the desired start position thereof, as determined by a coarse start position defining set of switches 10 having a set of movable contacts 11 variably tapping transformer $T_y$. A variable resistance 12 is connected across the switches 10, 11 to comprise a fine start position adjustment.

Figure 4:
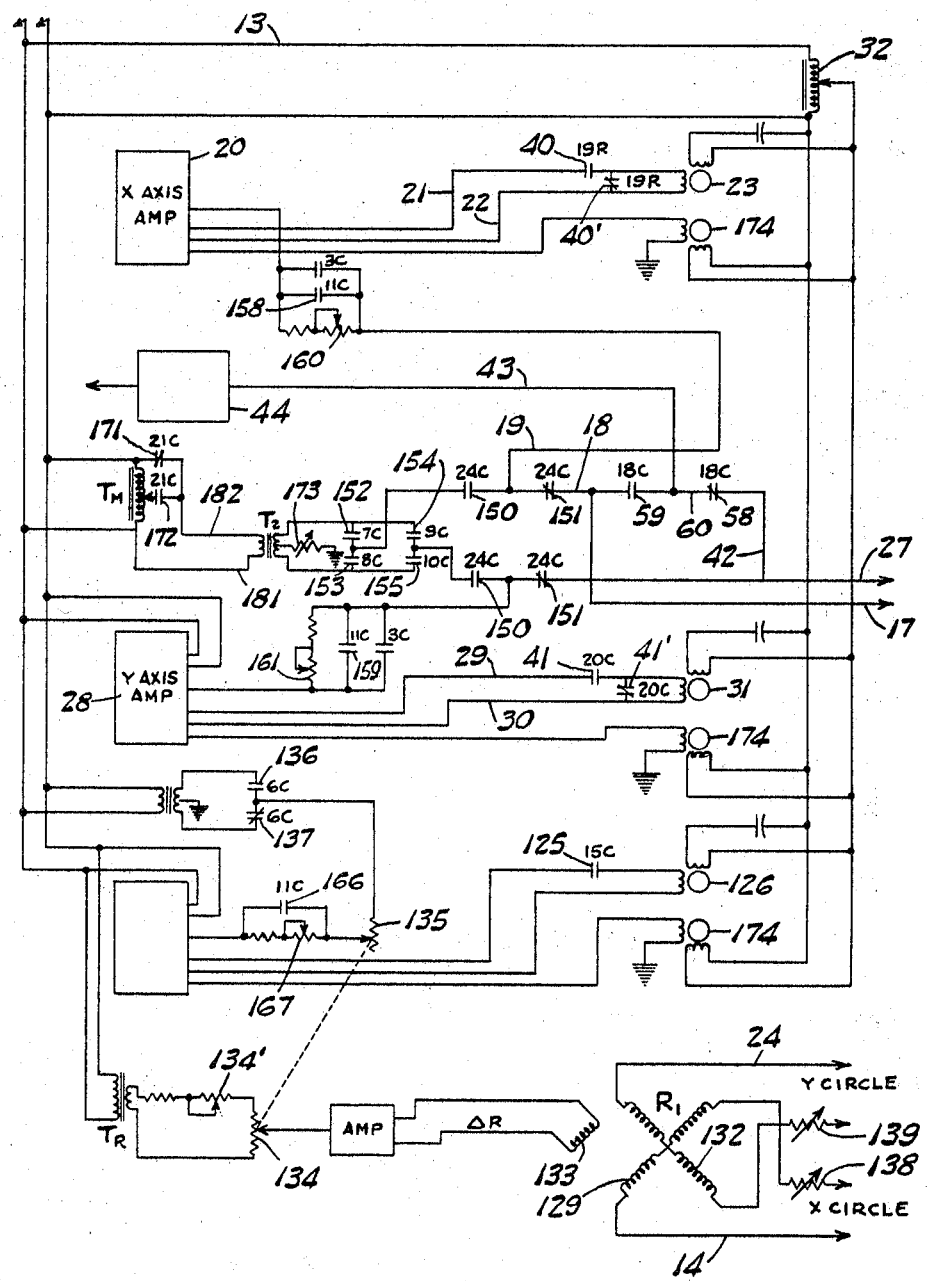

Transformers $T_x$ and $T_y$ are energized from a suitable alternating source, not shown. The X axis start position defining means 7–9 are balanced in an electrical bridge arrangement against the variable resistance 5, with the difference between the actual position of part 1 and the desired start position thereof being reflected in a signal transmitted via lead 14 to a rate limit controller 15. This signal is amplified and limited, as described hereafter, and transmitted via leads 16, 17, 18 and 19 to an X axis amplifier 20 (FIG. 4). The amplified signal then is transmitted via leads 21 and 22 to a servo-motor 23 which controls the driving of machine member 1 by its motor 2 in the manner of a mechanical amplifier as described in Patents 2,569,585, 2,569,586 and 2,585,507.

In like manner, the Y axis start position defining means 10–12 are balanced in an electrical bridge against variable resistance 6, whereby any difference between the actual position of machine member 3 and the desired start position thereof produces an output signal which is transmitted via lead 24 to a Y axis rate limit controller 25, where it is amplified and limited, with the resulting output signal being transmitted via leads 26 and 27 to an amplifier 28. The amplified signal passes via leads 29 and 30 to a servomotor 31 which controls the driving of member 3 by its motor 4 in the manner of a mechanical amplifier, as previously described. Servomotors 23 and 31 are energized from a suitable source, not shown, via leads 13' and a variable inductance 32.

The energization of servomotors 23 and 31 is controlled by a start switch 33 (FIG. 1) arranged to close an energizing circuit to 13R relay 34. Relay 34 closes a set of contacts 35, completing a holding circuit for relay 34, and closes further sets of contacts 36, 37 (FIG. 2) completing energizing circuits to X and Y axis relays 38 and 39, respectively. Energization of relay 38 closes contacts 40 and opens contacts 40', completing an energizing circuit to servomotor 23. Energization of relay 39 closes contacts 41 and opens contacts 41', completing an energizing circuit to servomotor 31.

The Y axis start difference signal also is transmitted via leads 42 and 43 to a null relay driver 44 which closes contacts 13, to complete an energizing circuit via lead 45 (FIG. 1) to 12R null relay 46 upon arrival of the machine part 3 at its start position. Energization of relay 46 closes contacts 47 to complete an energizing circuit via lead 48 to 5T relay 49. Relay 49 closes contacts 50 to complete a holding circuit. After a time delay, relay 49 also closes a switch 51 to prepare an energizing circuit via lead 52 for 16R relay 53, which circuit will be completed when null relay 46 again closes to again momentarily close contacts 47.

Figure 2:
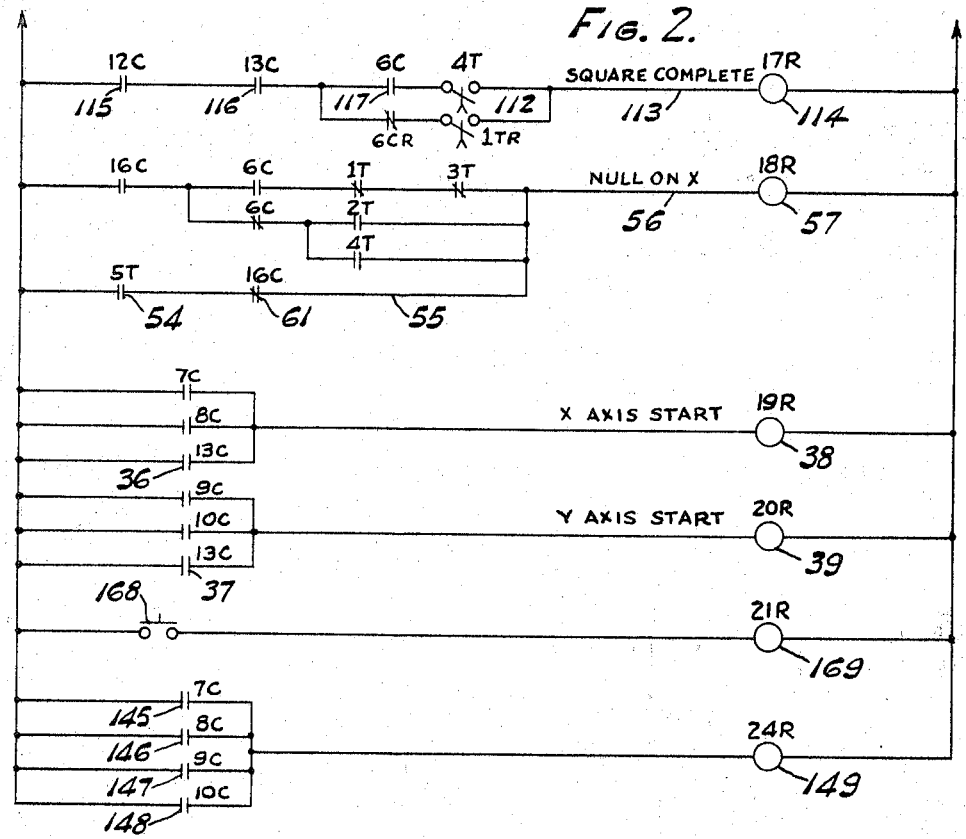
Figure 3:
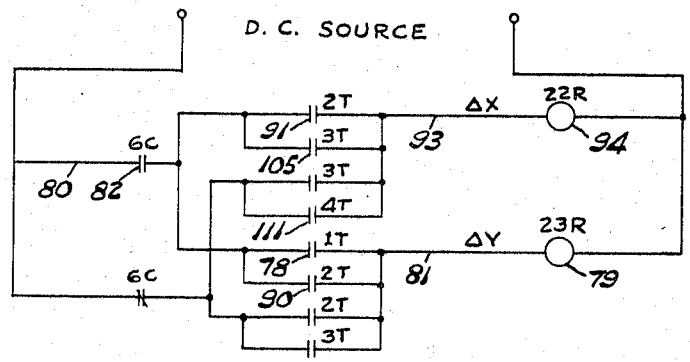

The second energization of null relay 46 is accomplished by arrival of the other machine part at its start position. Energization of relay 49 also closes contacts 54, completing an energizing circuit via leads 55 and 56 to 18R relay 57 (FIG. 2). Energization of relay 57 opens contacts 58 (FIG. 4), interrupting the Y axis signal circuit through lead 42 while closing contacts 59 to complete an X axis signal circuit via leads 60 and 43 to the relay driver 44, for actuating relay 46 as previously described. Actuation of relay 46 after switch 51 has closed completes an energizing circuit to relay 53 which closes contacts 54' to complete a holding circuit. The machine parts now are at their start position. A normally open square advance switch 46' is provided, to energize null relay 46 when either part is already at start position.

Relay 57 is deenergized by opening of contacts 61 upon energizing relay 53.

Energization of relay 53 also closes contacts 62 (FIG. 1), completing an energizing circuit via leads 63, 64, 65, 66 and 67 to 1T relay 68. The contacts 69 previously will have been closed by 2R relay 70 energized via lead 71 under control of a manual-automatic mode control switch 72. Contacts 73 will have been closed, by energization of 6R relay 74 under control of a switch 75 determining the direction of movement about the rectangle (i.e. clockwise or counter-clockwise). The contacts 76 are closed, momentarily, by energization of null relay 46.

Energization of relay 68 closes contacts 77 to complete a holding circuit. Energization of relay 68 also closes contacts 78 (FIG. 3), completing an energizing circuit to 23R relay 79 via leads 80 and 81, under control of contacts 82 which are closed upon energization of relay 74. Relay 79 closes contacts 83 and opens contacts 84, thereby adding to the Y start position signal in the bridge an energizing signal indicating the desired length $\Delta Y$ of the Y axis side of the rectangle. This Y axis distance signal is defined by a coarse position switch 85 and a fine position, adjustable resistance 85'. The introduction of this added, distance signal unbalances the bridge, causing energization of the servomotor 31, to drive the member 3 along the Y axis only. The X axis signal is of zero magnitude during this time, in the absence of a mechanical disturbance creating an error signal.

Upon arrival of the machine part at the end of that Y axis side of the rectangle null relay 46 is energized in the same manner as before, momentarily closing the contacts 76. This completes an energizing circuit to 2T relay 86, the time delay switch 87 having previously been closed by energization of relay 68. Energization of relay 86 closes contacts 88, to complete a holding circuit, and opens contacts 89 to deenergize relay 68. Deenergization of relay 68 opens contacts 78 (FIG. 3), but energization of relay 86 closes contacts 90 to maintain an energizing circuit to $\Delta Y$ relay 79. Relay 86 also closes contacts 91 to complete an energizing circuit via leads 80 and 93 to ΔX 22R relay 94. Energization of relay 94 closes contacts 95 and opens contacts 96, thereby adding to the X start position signal in the bridge a signal denoting the length of the X axis side of the rectangle. The X axis distance signal is defined by the setting of a coarse control switch 97 and a fine control adjustable resistance 98. This unbalances the bridge, causing energization of servomotor 23 to drive machine parts 1 and 3 along the X axis while maintaining the Y start plus ΔY position thereof on the Y axis.

Upon arrival of parts 1 and 3 at the end of that X axis side of the rectangle, null relay 46 is energized as before. This closes contacts 76, completing an energizing circuit to 3T relay 99 via lead 100, the time delay switch 101 having previously been closed by energization of relay 86. Energization of relay 99 closes contacts 102 to complete a holding circuit, and opens contacts 103 and 104 to interrupt the energizing circuits to relays 68 and 86. Energization of relay 99 also closes contacts 105, again completing an energizing circuit to the ΔX relay 94, whereby the X axis bridge remains balanced at the X start plus ΔX position. ΔY relay 79 is deenergized, however, opening contacts 83 and closing contact 84. This removes the ΔY signal from the Y axis bridge, thereby unbalancing the Y axis bridge in a direction causing part 3 to move along the Y axis for the second time but in the opposite direction. When that side of the rectangle is completed, null relay 46 again is energized. When this occurs, contacts 76 are again closed, completing an energizing circuit to 4T relay 106 via lead 107 and time delay switch 108 which previously has been closed by relay 99. Energization of relay 106 closes contacts 109, completing a holding circuit, and opens contacts 110 to deenergize 1T, 2T and 3T relays 68, 86 and 99. Energization of relay 106 also closes a further set of contacts 111 which completes an energizing circuit to the ΔX relay 94, but only when proceeding counter clockwise. Therefore, both ΔX and ΔY relays 94, 79 are deenergized. Since machine part 3 is at start position on the Y axis, only the X axis bridge is unbalanced, by the deletion of the ΔX signal. Parts 1 and 3 therefore are driven along the X axis to start position, completing the rectangle.

Relay 106 also closes time delay switch 112, completing an energizing circuit via lead 113 to a relay 114, subject to energization of null relay 46 to close contacts 115. The contacts 116 have previously been closed by relay 34, and the contacts 117 have previously been closed by relay 74. Energization of relay 114 opens the contacts 118, deenergizing the start cycle relay 34 whereupon the system comes to rest. Relay 34 also can be deenergized manually by stop switch 119.

If switch 74 is activated for counter clockwise movement, the operation is the same except that the machine moves along the X axis from the start position, and is controlled by the lower half of the shift register. The operation is the same as described above, except that the direction of travel is reversed, whereby a more detailed description is believed unnecessary.

CIRCLE GENERATOR

For circle generation, switch 120 (FIG. 1) is moved to energize 3R relay 121. This closes contacts 122 to energize 15R resolver relay 123, contacts 124 having been closed by relay 70. This closes contacts 125 (FIG. 4) to complete an energizing circuit to servomotor 126 for driving resolver $R_1$. Relay 121 also closes contacts 127 (FIG. 5) and opens contacts 128, placing one set of quadrature rotor windings 129 of resolver $R_1$ in series with the X axis bridge via lead 14. In like manner, relay 121 closes contacts 130 and opens contacts 131, placing the opposite set of quadrature rotor windings 132 of resolver $R_1$ in series with the X axis bridge via lead 24. Stator winding 133 of resolver $R_1$ is energized in accordance with the desired radius as determined by an adjustable resistance 134 across a transformer $T_R$. Resistance 134 can be varied to provide the desired radius in analog, voltage terms. A calibrating resistance 134' also is provided.

Thus, parts 1 and 3 are driven under control of their respective servomotors 23 and 31, as before. However, the signals to servomotors 23 and 31 are constantly varying in accordance with the X and Y axis components of the radius signal ΔR, the latter being resolved into its X and Y components by the resolver rotor windings 129 and 132. In this way, a circle of radius ΔR is generated about the X and Y start position.

Resistance 134 can be adjusted to vary the radius ΔR. With resolver $R_1$ rotating at constant speed, the tangential speed of the machine parts will be increased if the radius is increased. However, it is a particular feature of our invention that means also are provided to vary the speed of rotation of resolver $R_1$. Preferably, such means are operable automatically upon a change in radius to maintain a predetermined tangential velocity.

In the illustrated embodiment, such means comprise a variable resistance 135 interposed in the energizing circuit of resolver servomotor 126 and connected to variable resistance 134 so that the energizing signal to servomotor 126 is decreased, to reduce the speed of rotation of the resolver rotor, as the radius signal ΔR is increased. Also, resistance 135 can be adjusted independently of resistance 134, to selectively vary the speed of rotation of the resolver rotor and thereby vary the tangential velocity for a given radius.

The direction of rotation can be reversed, by switching contacts 136 and 137 under control of relay 74, as described above in connection with rectangle generation.

All other things being equal, the arrangement described above generates a circle. However, it is a particular feature of our invention that ellipses and other non-circular curvilinear forms also can be generated. In the illustrated embodiment, this is accomplished by providing variable resistances 138 and 139 in series with rotor windings 129 and 132, respectively, on the output side of the resolver. The introduction of a resistance into either axis unbalances the resolver output, distorting the basic circle into an ellipse.

Resistances 138 and 139 can be adjusted to an off position for circle generation. For generating an ellipse in which the X axis is the minor axis, resistance 138 is adjusted to the desired on position. To generate an ellipse in which the Y axis is the minor axis, resistance 139 is adjusted to the desired on position.

Obviously, the control circuits of our invention can be arranged to generate a circle, or an ellipse, at any corner of the rectangle.

MANUAL DIRECTION CONTROL

A manually operable joy stick 140 (FIG. 1) is arranged for selective energization of 7R and 8R X axis relays 141 and 142, and of 9R and 10R Y axis relays 143 and 144. Relays 141–144, when energized, close contacts 145–148, respectively, (FIG. 2) thereby energizing 24R relay 149 which closes contacts 150 and opens contacts 151 (FIG. 4). Relays 141–144 also close contacts 152–155, respectively, for selectively energizing servomotors 23 and 31 in either direction, from transformers $T_M$ and $T_Z$.

For moving at a "times 5" feed rate, switch 156 is closed, energizing 11R relay 157. This closes contacts 158 and 159, bypassing the X and Y axis calibrating and associated resistances 160, 161. It opens contacts 162 and 163, placing resistances 164 and 165 in the X and Y axis rate limit controller circuits, and closes contacts 166, bypassing the calibrating and associated resistances 167 in the resolver servomotor energizing circuit.

A rapid feed rate switch 168 (FIG. 2) also is provided. This switch energizes 21R relay 169, which closes contacts 170 (FIG. 1) to energize relay 157. It also closes contacts 171 and opens contacts 172 in the joy stick energizing circuit. A joy stick feed rate calibrating resistance 173 also is provided.

It will be noted that a tachometer feedback control is provided for each servomotor 23, 31 and 126, as indicated at 174, such controls being known, per se. Also, a main power switch is provided, as indicated at 190' (FIG. 1).

RATE LIMIT CONTROLLER

The system thus far described will produce a speed of travel proportional to voltage. The voltage is highest at the beginning of travel, with the result that an extremely rapid acceleration is produced. In some instances, such as flame cutting for example where a predetermined time is required to cut through the metal, such uncontrolled, rapid acceleration is objectionable.

Therefore, it is another feature of our invention that acceleration is controlled. This is accomplished by limiting the drive signals. A rate limit controller of the type shown in FIG. 6 can be used for this purpose. A separate controller is provided for each axis, as shown at 15 and 25 in FIG. 5. Since they are identical, only one is shown in FIG. 6.

The axis drive signal passes via lead 175 to the input of a three stage input amplifier section 176 of a known type well understood in the art. The input gain can be varied by adjusting resistance 177. Resistance 190 and diodes 191 clip the input signal to a level below the saturation level of the amplifier. Successive amplifier stages are coupled by condensers 192, and negative feedback is provided from the second to the first stage via resistance 193. Each amplifier stage has a cathode bias resistance 194, and the second and third stages also have a cathode by-pass to ground via condenser 195, permitting greater gain. Grounding resistances 196 also are provided.

Amplifier section 176 is coupled by condenser 184 and timing resistance 185 to an acceleration limiter section 186 and rate limiter section 178. The large A.C. signal present at the beginning of travel is converted by acceleration limiter section 186 to a signal which increases exponentially from zero to a maximum value determined by limiter section 178. The time constant of the exponential rise is a function of the output impedance of the last amplifier stage, and of resistance 185 in conjunction with condensers 187 and resistance 196' which thereby determines the acceleration rate of the system. Diodes 197 provide full wave rectification, converting the A.C. signal to a D.C. signal. Limiter section 178 is conventional, per se, and chops the amplified drive signal, holding it to a predetermined level.

The signal thus limited then is attenuated, by resistances 198, 179 and 199, and transmitted via coupling condenser 200, impedance matching cathode follower 201, coupling condenser 202 and lead 16 (or 26) to the servomotor energizing circuit. The output gain of the amplifier-limiter can be varied, by adjusting resistance 179. Cathode follower 201 is of known type, having cathode resistance 203 and 205 and grid resistance 204.

The rate-limiter section 178 is energized from an A.C. source, not shown, via variable transformer $T_M$ and leads 180 and 181. It includes a step-down transformer 206, current limiting resistances 207, power supply diodes 208, RC filter networks 209 and 210, and limiting diodes 211.

Amplifier section 176 is energized from a D.C. source, not shown, via a decoupling section 188 which latter is conventional, per se. Section 188 comprises successive RC decoupling stages 212, 213, to which cathode follower 201 is connected and to which the amplifier stages are connected via plate resistances 214.

Since the foregoing amplifier, limiter and decoupling sections 176, 178, 185 and 188, and cathode follower 201, are of a type known in the art and conventional per se, further description thereof is unnecessary.

By thus limiting the drive signals to the A.C. servomotors 23 and 31 to a predetermined level, which can be adjusted, feed rate is controlled. By initially limiting the drive signals exponentially, acceleration is controlled. Speed of travel will be constant during the middle part of travel, and deceleration is controlled by the signal voltage dropping below the limiter level as the end of travel is approached.

Acceleration is a problem when generating rectilinear forms having corners requiring starting and stopping. However, it usually is not a problem when generating circles, ellipses or the like. Therefore, the limiter section is disabled by circle generation relay 121 (FIG. 1), which open contacts 183 (FIG. 6) when energized.

Accordingly, it is seen that our invention fully accomplishes its intended objects. While specific reference has been made in the foregoing disclosure to flame cutting apparatus, it will be appreciated that our invention is by no means limited thereto, that being merely an illustrative specific application thereof. Also, while only a single embodiment has been set forth in detail, that has been done by way of illustration only, without thought of limitation.

Having fully disclosed and completely described our invention, and its mode of operation, what we claim as new is:

1. A machine control system for generating rectangles comprising, in combination with a machine having a part movable along two axes, means producing a first signal indicating the desired start position of said part along one of said axes, means producing a second signal indicating the length of the rectangle along said one axis, means producing a third signal indicating the actual position of said part along said one axis, corresponding first, second and third signal producing means for said part along the other of said axes, switching means for adding said second signal producing means to said first signal producing means, drive signal producing means responsive to the differences between said third signals and said first signals with and without said second signals, and drive means responsive to said drive signal producing means for causing movement of said part separately and independently along each of said axes.

2. A machine control system as set forth in claim 1, wherein said first and second signal producing means are selectively variable.

3. A machine control system as set forth in claim 1, together with means for reversing the direction of movement of said part in generating a rectangle.

4. A machine control system as set forth in claim 1, together with manually operable drive signal producing means.

5. A machine control system as set forth in claim 1 further comprising: means for producing first null signals in response to an equality between said first and third signals and second null signals in response to an equality between said second and third signals; means responsive to said first null signals for maintaining said machine part at the desired start position; and means for sequentially activating said switching means in response to said second null signals.

6. A machine control system for generating rectangles comprising, in combination with a machine having a first part movable along one axis and another part movable along another axis, and drive means for moving said parts separately and independently along said axes, means producing a first signal indicating the actual position of said first part along said one axis, means producing a second signal indicating a desired start position of said first part along said one axis, means comparing said first and second signals and producing a third signal indicating the distance and direction from the actual position of said first part to the desired position thereof along said one axis, means producing a fourth signal indicating the distance to be traveled by said first part along said one axis to and from the desired start position thereof, corresponding first, second, third and fourth signal producing means for said second part along said other axis, said drive means being responsive to said third signal producing means, and switching means operable to sequentially switch said fourth signal producing means into and out of said comparing means, whereby said drive means cause said first and second parts to traverse a rectangular path.

7. A machine control system as set forth in claim 6, wherein said comparing means comprise electrical balance bridge means, and wherein said switching means are operable automatically upon arrival of said parts at the ends of their travel along said axes.

8. A mchine control system for generating rectangles comprising, in combination with a machine having a first part movable along another axis, and drive means for moving said parts along said axes, means producing a first signal indicating the actual position of said first part along said one axis, means producing a second signal indicating a desired start position of said first part along said one axis, means comparing said first and second signals and producing a third signal indicating the distance and direction from the actual position of said first part to the desired start position thereof along said one axis, means producing a fourth signal indicating the distance to be traveled by said first part along said one axis to and from the desired start position thereof, corresponding first, second, third and fourth signal producing means for said second part along said other axis, said drive means being responsive to said third signal producing means, and switching means operable to sequentially switch said fourth signal producing means into and out of said comparing means, whereby said drive means cause said first and second parts to traverse a rectangular path, together with acceleration control means converting said third signals to exponentially increasing signals.

9. A machine control system as set forth in claim 8 wherein said acceleration control means limit said third signals to a predetermined maximum.

10. A machine control system as set forth in claim 9 wherein said acceleration control means comprises: a variable gain amplifier having an input and output; means for applying said third signal to the input of said amplifier; coupling means connected to the output of said amplifier; a limiting circuit having an input connected to a variable A.C. source and an output; a conversion circuit for providing exponentially increasing waveforms and connected to said coupling means and to said limiting circuit; and an attenuating network connected to said conversion circuit.

11. A machine control system as set forth in claim 10 wherein said conversion circuit comprises: a first resistor having a first terminal connected to said coupling means and a second terminal; a second resistor; first and second diodes oppositely connected between the second terminal of said first resistor and one of each of the terminals of said second resistor; and first and second capacitors each connected between one of the terminals of said second resistor and ground.

12. A machine control system for generating circles comprising, in combination with a machine part movable along angularly related axes, and drive means for moving said part along said axes, means defining a predetermined position of said part along one of said axes, means defining a predetermined position of said part along the other of said axes, resolver means having a first winding and quadrature second windings, means producing a signal across said first winding indicating the desired radius of the circle to be generated, means rotating one of said windings relative to the other, whereby said radius signal is resolved by said second winding into its axial components, and means connecting said second quadrature windings to said position defining means and said drive means, whereby said part is moved about said predetermined position, means for adjusting said radius signal producing means to vary the radius of travel of said part about said predetermined position, and means for varying the speed of rotation of said resolver.

13. A machine control system as set forth in claim 12, wherein said last-named means are operable automatically to maintain a predetermined tangential velocity of said part with variations in said radius of travel.

14. A machine control system for generating ellipses and similar non-circular curvilinear forms comprising, in combination with a machine part movable along angularly related axes, and drive means for moving said part along said axes, means defining a predetermined position of said part along said axes, resolver means having a first winding and quadrature related second windings, means producing a signal across said first winding indicative of a radius, means rotating one of said windings relative to the other whereby said quadrature windings resolve said radius signal into its axial components, means connecting said quadrature windings to said drive means for driving said part in accordance with said axial components, and means for biasing said signal components to produce a varying radius of travel of said part.

15. A machine control as set forth in claim 14, wherein said last-named means comprise adjustable biasing resistors in series with said quadrature windings.

References Cited

UNITED STATES PATENTS

| | | | |
|---|---|---|---|
| 2,862,661 | 12/1958 | Goldman | 318—28 XR |
| 2,900,586 | 8/1959 | Spencer et al. | 318—19 XR |
| 3,148,316 | 9/1964 | Herchenroeder | 318—19 |
| 3,161,110 | 12/1964 | Fitzner | 318—162 XR |
| 3,259,819 | 7/1966 | Heiser | 318—162 XR |
| 3,328,655 | 6/1967 | Tripp | 318—28 XR |

BENJAMIN DOBECK, *Primary Examiner.*

U.S. Cl. X.R.

318—28, 30